United States Patent
Wereski (10) Patent No.: US 10,665,004 B2
(45) Date of Patent: May 26, 2020

(54) SYSTEM AND METHOD FOR EDITING AND MONETIZING PERSONALIZED IMAGES AT A VENUE

(71) Applicant: C. J. Wereski, Elma, NY (US)

(72) Inventor: C. J. Wereski, Elma, NY (US)

(*) Notice: Subject to any disclaimer, the term of this patent is extended or adjusted under 35 U.S.C. 154(b) by 397 days.

(21) Appl. No.: 15/487,742

(22) Filed: Apr. 14, 2017

(65) Prior Publication Data

US 2017/0300890 A1    Oct. 19, 2017

Related U.S. Application Data

(60) Provisional application No. 62/322,335, filed on Apr. 14, 2016.

(51) Int. Cl.
| | |
|---|---|
| *G06T 11/60* | (2006.01) |
| *G06Q 20/12* | (2012.01) |
| *G06Q 20/32* | (2012.01) |
| *G06Q 30/06* | (2012.01) |
| *G06Q 50/00* | (2012.01) |
| *G06F 8/61* | (2018.01) |

(52) U.S. Cl.
CPC ............... *G06T 11/60* (2013.01); *G06F 8/61* (2013.01); *G06Q 20/123* (2013.01); *G06Q 20/3223* (2013.01); *G06Q 30/0601* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,392,268 | B2 * | 3/2013 | Smith | G07F 11/54 |
| | | | | 705/26.1 |
| 8,655,718 | B2 | 2/2014 | Athsani et al. | |
| 9,041,784 | B2 * | 5/2015 | Rivera | G11B 27/002 |
| | | | | 348/61 |
| 9,361,135 | B2 * | 6/2016 | Doi | G06F 9/445 |
| 9,544,379 | B2 * | 1/2017 | Gauglitz | G06Q 30/06 |

(Continued)

OTHER PUBLICATIONS

Anon., "Dreamstinne Opens up World's Largest Designer Community to Mobile Photographers: Launches Dreamstime Companion iOS and Android App—Uploaded Mobile Photos Can be Purchased by Designer Community of over 8 Million Users," PR Newswire [New York] Jul. 15, 2014 (Year: 2014).*

*Primary Examiner* — Nicholas D Rosen
(74) *Attorney, Agent, or Firm* — Vincent G. LoTempio; David Stephenson (57) ABSTRACT

A system and method for editing and monetizing personalized images at a venue allows a user to access a personal, dynamic image captured by multiple image capturing devices positioned proximally to the venue and a performer at the venue. The image capturing devices are positioned in multiple viewpoints to capture dynamic close up images of the venue and the performer. The user can purchase the images and edit the images through a smartphone app. The image provided to the user is unique and deleted from the account to ensure that no one else shares the user's unique image. In editing the image, user can integrate a supplemental image, like a selfie, integrate text, or crop the image. User can display, trade, or market the edited image. Revenue is generated by charging the user for the selected image and charging a sponsor to communicate to user through the software application.

19 Claims, 4 Drawing Sheets

(56) References Cited

U.S. PATENT DOCUMENTS

| | | | |
|---|---|---|---|
| 9,578,350 B2* | 2/2017 | Zucchetta | H04N 21/2143 |
| 9,866,749 B2* | 1/2018 | Relf | H04L 51/10 |
| 9,998,671 B2* | 6/2018 | Park | G06T 11/60 |
| 2007/0061365 A1* | 3/2007 | Giegerich | G06Q 30/02 |
| 2009/0079828 A1* | 3/2009 | Lee | B60R 1/00 |
| | | | 348/148 |
| 2009/0234716 A1 | 9/2009 | Mallick et al. | |
| 2010/0329513 A1* | 12/2010 | Klefenz | G01C 21/00 |
| | | | 382/104 |
| 2011/0066494 A1* | 3/2011 | Smith | G07F 11/54 |
| | | | 705/14.49 |
| 2011/0131529 A1* | 6/2011 | Doi | G06F 9/445 |
| | | | 715/810 |
| 2013/0275505 A1* | 10/2013 | Gauglitz | G06Q 30/06 |
| | | | 709/204 |
| 2013/0346226 A1* | 12/2013 | Nunes | G06Q 30/0605 |
| | | | 705/26.2 |
| 2014/0081797 A1* | 3/2014 | Rivera | G11B 27/002 |
| | | | 705/26.5 |
| 2014/0168477 A1* | 6/2014 | David | G06Q 30/0601 |
| | | | 348/240.2 |
| 2015/0042823 A1* | 2/2015 | Relf | H04L 51/10 |
| | | | 348/207.1 |
| 2015/0062334 A1* | 3/2015 | Dickinson | H04N 7/181 |
| | | | 348/143 |
| 2015/0347827 A1* | 12/2015 | Dickinson | G06K 9/00302 |
| | | | 382/103 |
| 2016/0063318 A1* | 3/2016 | Cheatham, III | G06K 9/00335 |
| | | | 348/143 |
| 2016/0088229 A1* | 3/2016 | Park | G06T 11/60 |
| | | | 348/239 |
| 2016/0105691 A1* | 4/2016 | Zucchetta | H04N 21/2143 |
| | | | 725/82 |
| 2016/0205358 A1* | 7/2016 | Dickinson | H04N 7/181 |
| | | | 348/157 |

* cited by examiner

SYSTEM AND METHOD FOR EDITING AND MONETIZING PERSONALIZED IMAGES AT A VENUE

CROSS REFERENCE OF RELATED APPLICATIONS

This application claims the benefits of U.S. provisional application No. 62/322,335, filed Apr. 14, 2016 and entitled SYSTEM AND METHOD FOR REMOTELY CAPTURING AND MANIPULATING IMAGES AT AN EVENT VENUE, which provisional application is incorporated by reference herein in its entirety.

FIELD OF THE INVENTION

The present invention relates generally to a system and method for editing and monetizing personalized images at a venue. More so, the system and method allows a user to capture and edit dynamic, remote images at a venue through a mobile communication device by providing the user with a plurality of captured images from multiple vantage points at the venue, and then enabling the user to select and purchase a desired captured image; whereby the selected image may be edited by the user by: integrating at least one supplemental image into the selected image, displaying the edited image on a social media site, trading the edited image, commercializing the edited image, printing the edited image on media, and applying text and filters to the edited image; whereby the venue and the performer pay a fee to receive access and communicate with the user through a software application on the mobile communication device; whereby a sponsor may advertise on the mobile communication device through the software application; and whereby the venue and the performer pay a fee to receive access and communicate with the user through a software application on the mobile communication device.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, the use of digital photography has become an important part of daily life for many individuals. Many cellular phones now include cameras and many social networking application facilitate the sharing of digital photos among many individuals and social groups. People attend a variety of different types of events (e.g., rock concerts, symphonies, plays, etc.) in a variety of different settings, many of which provide less than optimal listening conditions. People often take pictures of events. Photographs of events may often be shared with other individuals and social groups, for example through social networking applications or other collaborative sharing applications.

Often, a still photograph contains one or more individuals at a particularly memorable location or event. If the photograph is taken by the consumer, that person is often left out of the picture. If the photograph is taken by the amusement park at a predetermined site, the composition of the photograph is constrained. Moreover, the fee typically charged for such a photograph makes the purchase of more than a few cost-prohibitive. The still photograph captures only a moment in time, and does not reflect the majority of the consumer's experience.

It is recognized in the art that the proliferation of digital multimedia content, including images, over the Internet, has fueled tremendous desire for manipulation of the content. One reason may be to allow for individual expression associated with images. Unfortunately, the current state of the image editing experience for many users, particularly with regard to sophisticated editing, is not satisfactory.

Other proposals have involved proliferation of personal photographs, and at an event or venue. The problem with these venue photographing methods is that they do not optimize the image of the user with the image of the performer in the venue. Also, the editing features do not allow for integration between pictures of the performer and user. Also, monetization of the image capturing process is not always available. Even though the above cited venue photographing methods meet some of the needs of the market, a system and method for editing and monetizing personal images at a venue that allows a user to capture and edit dynamic, remote images at a venue through a mobile communication device by providing the user with a plurality of captured images from multiple vantage points at the venue, and then enabling the user to select and purchase a desired captured image; whereby the selected image may be edited by the user is still desired.

SUMMARY

Illustrative embodiments of the disclosure are generally directed to a system and method for editing and monetizing personalized images at a venue. The system and method allows a user to access a personal, dynamic image captured by multiple image capturing devices positioned proximally to the venue and a performer at the venue. The image capturing devices are positioned in multiple viewpoints to capture dynamic close up images of the venue and the performer.

The user can purchase the images and edit the images through an editor on a smartphone app. The image provided to the user is unique and deleted from the account to ensure that no one else shares the user's unique image. In editing the image, user can integrate a supplemental image, like a selfie, integrate text, or crop the image. The user can display, trade, or market the edited image. Revenue is generated by charging the user for the selected image and charging the performer or a sponsor to communicate to the user through the software application.

In one aspect, a method for editing and monetizing personal images at a venue comprises an initial step of positioning a plurality of image capturing devices proximally to a venue and a performer at the venue, the position of the plurality of image capturing devices including at least one of the following views: a top pan view, a bottom pan view, a top angle perspective view, a bottom angle perspective view, a close up view, and a three-dimensional view.

Another Step includes capturing a plurality of images of the venue and the performer with the plurality of image capturing devices.

Another Step includes transmitting the plurality of images to a data storage device.

Another Step includes downloading a software application on a mobile communication device, the software application configured to enable access to the data storage device and editing of the plurality of images.

Another Step includes crediting, by the user, an account through the software application.

Another Step includes selecting, by the user, at least one image from the plurality of images captured by the plurality of image capturing devices.

Another Step includes purchasing the selected image with at least a portion of the credit in the account.

Another Step includes editing the selected image, the editing including at least one of the following: integrating a supplemental image into the selected image, integrating text into the selected image, cropping the selected image, rotating the selected image, and expanding the selected image.

Another Step includes displaying the edited image.

Another Step includes trading the edited image on a network.

A final Step comprises transmitting a message from at least one of the following: a sponsor, an associate of the venue, and the performer at the venue, to the user.

In another aspect, the step of deleting the selected image from the data storage device, whereby the user has a unique image.

In another aspect, the method further comprises a step of providing the sponsor, the associate of the venue, and the performer at the venue, access to the user, whereby the access enables transmission of the message.

In another aspect, the method further comprises a step of charging a fee to the sponsor, the associate of the venue, and the performer at the venue, for providing access to the user.

In another aspect, the method further comprises the step of transmitting a message from at least one of the following: a sponsor, an associate of the venue, and the performer at the venue, to the user, further includes transmitting a text, a phone call, or an email.

In another aspect, the method further comprises a step of watermarking the plurality of images.

In another aspect, the method further comprises a step of transmitting credit from the account to the performer.

In another aspect, the method further comprises a step of printing the edited image on at least one of the following: a cap, a mug, a t-shirt, a towel, and a marketing publication.

In another aspect, the method further comprises the step of displaying the edited image, further comprises displaying the edited image on at least one of the following: a social media site, a website, a network, a photo gallery, and a video gallery.

In another aspect, the method further comprises a step of selecting from a plurality of thumbnail images.

In another aspect, the plurality of thumbnail images remain miniature sized until the user purchases the selected image.

In another aspect, the software application is configured to communicate with the plurality of image capturing devices.

In another aspect, the plurality of image capturing devices comprises a high definition camera.

In another aspect, the venue includes at least one of the following: a stadium, an auditorium, a sports field, a concert hall, and a play stage.

In another aspect, the plurality of images is a photograph or a video clip.

In another aspect, the data storage device is a server comprising a photo gallery and a video gallery.

One objective of the present invention is to enable a user, who is positioned remotely at a venue, a proximal image of a performer, and then enable the user to manipulate the image, so as to appear proximal to the performer.

Another objective is to enable a user at an event forum to not require having a front row seat to acquire a front row picture at the event forum.

Another objective is to provide high resolution close-up pictures of the performer that are not possible with a smart phone.

Another objective is to enable artists, celebrities, and athletes to share in revenue generated by the user's account and sponsors.

Another objective is to provide an easy to operate digital photo editing software for manipulating and transposing the captured images or video streams.

Another objective is to allow the user to easily display the edited image on social media sites, websites, marketing media, and networks.

Another objective is to trade the edited image on a network through payment or reception of credit from an account.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawing.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system and method for editing and monetizing personalized images at a venue is referenced in FIGS. 1-3B. The system 100 and method 200 for editing and monetizing personalized images at a venue, hereafter "system 100" and "method 200" allows a user 102 who is attending a venue 104 to access dynamic plurality of images 110 that are captured by a plurality of image capturing devices 108a, 108b, 108c positioned proximally to a performer 106 at the venue 104. User 102 may purchase the images 110 from a credit 116 in a user account 114. User 102 may then manipulate the selected image 110 remotely through a mobile communication device 120. Once the selected image is edited to a desired presentation, user 102 may display, trade, sell, buy, or market the edited image 118, as desired.

In essence, system 100 and method 200 allows user 102 to access and capture high definition photos of performers, artists, athletes, etc., at live events via cameras placed on the stage, field, or auditorium, which a remotely located user would not normally have access. Additionally, various other revenue generating means are also utilized by the system 100 and method 200.

Those skilled in the art will recognize that fans at concerts, sporting events, and live events cannot all sit in the first ten rows of the venue 104. Consequently, about 95% of the audience sits in seats which do not allow for the best photo opportunities via smart phones. This is especially damaging, since smart phones do not have strong zoom capacities. Thus, to enhance the fan's live event experience, system 100 and method 200 allows fans to get close-up pictures of the performers, celebrities, and athletes, by digitally memorializing the event forever. Fans can also take a "selfie" picture while at the event and place the selfie on any of the photos of their heroes further enhancing the "I was there" moment. Further, the fan may utilize these edited photos in various ways, including, sharing the photos on social media, printing the photos on media, and trading the photos.

Figure 1:
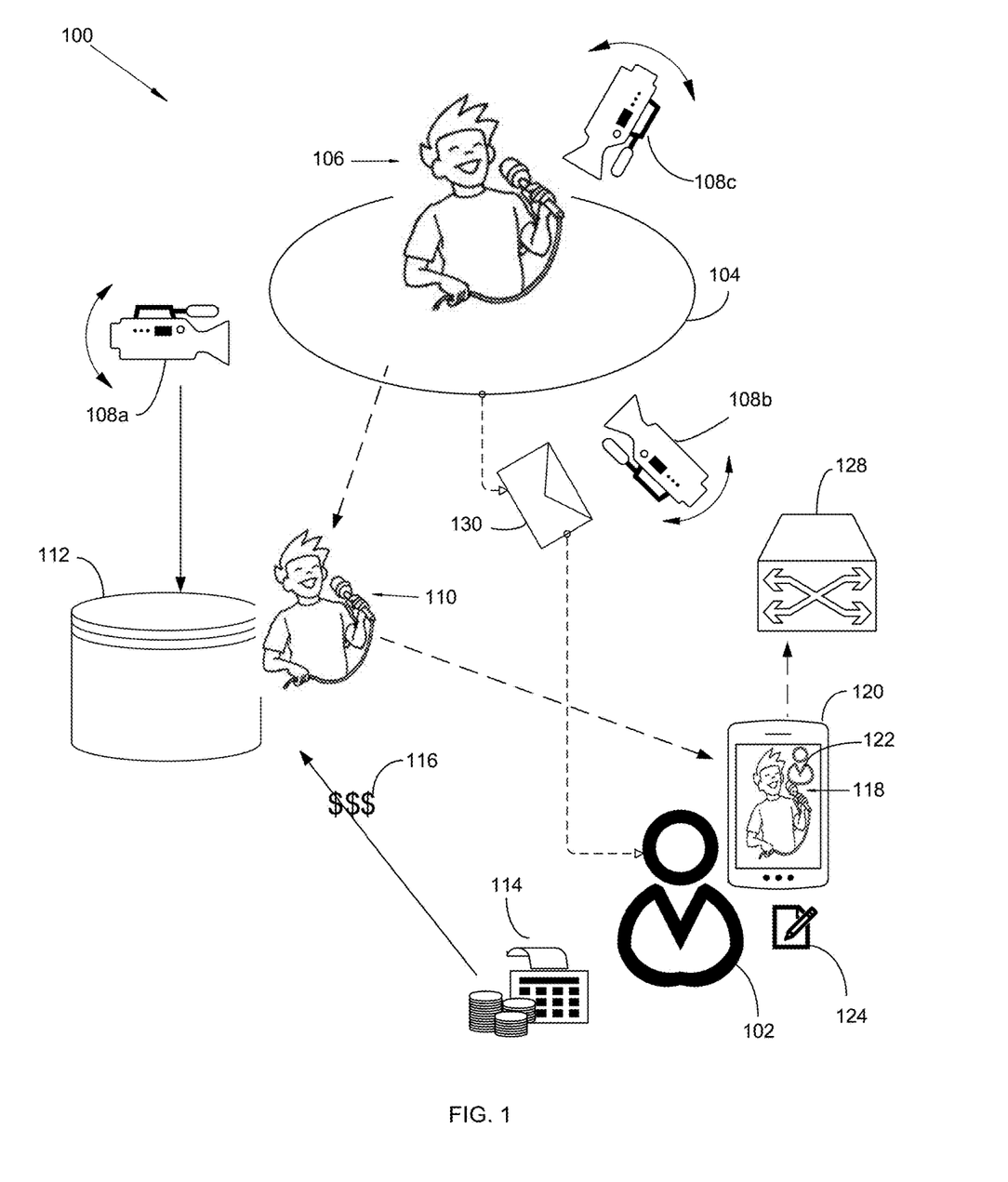
FIG. 1 illustrates a block diagram of an exemplary system for editing and monetizing personalized images at a venue, in accordance with an embodiment of the present invention.

As referenced in FIG. 1, system 100 utilizes a plurality of image capturing devices 108a, 108b, 108c that are disposed at various vantage points proximal to venue 104, and specifically a performer 106 at venue 104. Possible vantage points for image capturing devices may include, without limitation, a top pan view, a bottom pan view, a top angle perspective view, a bottom angle perspective view, a close up view, and a three-dimensional view. Further, the image capturing device may be controllable, so as to allow for extending, retracting, pivoting, rotating, and flash functions.

In some embodiments, image capturing devices 108a-c may include high definition cameras that provide images 110 generally not possible through a mobile communication device 120, such as a smart phone. In any case, the vantage point and quality of captured images 110 are unique and generally inaccessible to user 102, who may be more remotely positioned at venue 104.

In some embodiments, image capturing devices 108a-c may include still cameras that are controlled remotely, continuously and automatically (by the production staff) at the venue. Image capturing devices 108a-c also provide Wi-Fi-enabled SD memory cards to allow the transfer of data from the image capturing devices 108a-c to the data storage device, such as cloud servers.

Image capturing devices 108a-c dynamically capture images throughout the performance and transmit the images to a data storage device 112. In one alternative embodiment, captured image 110 is geotagged, so as to verify the authenticity of the venue 104. In another possible embodiment, the image capturing devices 108a, 108b, 108c capture video streams. A watermark may be applied to the video streams and is automatically removed once an image is saved to their storage site 112. The watermark may be applied to the video streams and is automatically removed once an image is saved to remote data storage site 112. In an alternative embodiment, the watermark would come off when the image is purchased and saved to the user's smartphone gallery, rather than the data storage site 112.

In one possible embodiment, user 102 can access image capturing devices 108a-c, and user can capture images. Though in a preferred embodiment, the producer of the event at the venue has the authority to release the images available for purchase to the users. Most likely, the release of images is generally towards the end of the event. Further, images may be stored on a server for 48 hours after performance. Though in other embodiments, images may be stored longer, or not stored at all.

In some embodiments, user 102 may download a software application on a mobile communication device 120 to access and purchase a desired image 110 of the performer 106 and/or venue 104 that is stored in the data storage device 112. Image 110 may be virtually in real time, or may be accessed after the event. The software application enables user 102 to access data storage device 112 containing the captured images. The software application may also be used to enable user 102 to manipulate the images. Image 110 may include a still photograph or a video stream.

In one alternative embodiment, the software application may be communication with the image capturing devices 108a, 108b, 108c, such that user 102 may control the images that are captured. For example, user 102 may pan the image capturing device 108a to a desired angle and zoom level, and then capture that specific image 110 at that vantage point.

In another alternative embodiment, the software application may be used by the performer 106 at the venue 104, or an associate of the venue 104, to communicate promotional items, upgrades, and giveaways to the user 102. In another alternative embodiment, the software application may be used by a sponsor to transmit advertisements and discounts to the user 102. In some embodiments, the software application may be downloadable through a Wi-Fi connection or an LTE broadcast at the venue 104. In some embodiments, the software application may be downloadable through a Wi-Fi connection or an LTE broadcast at the venue 104. It is also possible for user 102 to download the app anytime from anywhere, prior to, during or after the event.

Upon downloading the software application, user 102 may deposit a credit 116 into the system 100. Credit 116 enables user 102 to purchase a desired image 100 that is captured by image capturing device 108a, 108b, 108c. Credit 116 may also be used to enable unique manipulations of the image 110, or for transmitting funds to the performer 106 or a venue worker. In one other embodiment, user 102 may utilize an online music software, such as iTunes™ to pay for the service. But the user 102 may be using credits that will be provided to use to purchase images after making a purchase. It is significant to note that the user 102 is not buying the images 110 from the venue 104, but rather from the software application, including Rockuva app.

Thus, system 100 provides user 102 with a plurality of captured images 110 from multiple vantage points at the venue 104, and then enables user 102 to select and purchase a desired captured image from the venue 104. In one possible embodiment, the software application provides a drop down menu of "choose your event" type of feature. Once user 102 selects the desired event, user gains access to that venue for the event's content and notifications.

In yet another embodiment, user 102 may utilize credit 116 to pay performer 106 or an associate of the venue 104. For example, if user 102 is in a smaller venue, like a nightclub and wants to tip the band, user 102 utilizes the software application to forward the funds from the user's account 114 into the band's account. The image provided to the user 102 is unique and deleted from the account to ensure that no one else shares the user's unique image.

As discussed above, user 102 may access and purchase any of the images in data storage device 112. Data storage device 112 may include a server or processor having a photo gallery. The images 110 stored may be dynamic and very recent, including a few seconds old. In this manner, the most up-to-date image of the performer 106 is possible. It is significant to note that the images 110 are delivered to multiple users in a different random order that allows every user fair access to the more quality images and photographs that were captured at the venue 104.

Figure 2:
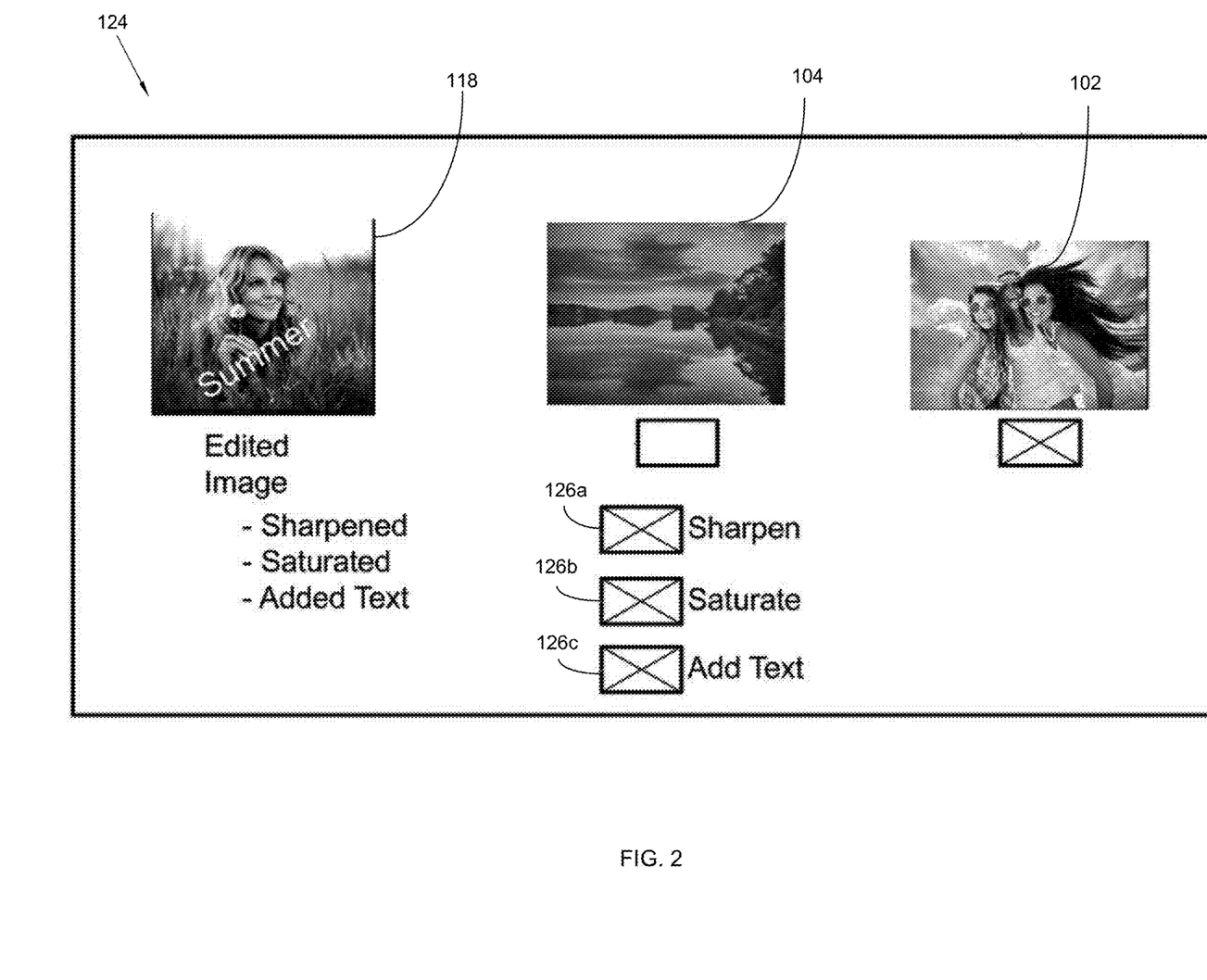
FIG. 2 illustrates a screenshot of an exemplary editor editing images at an event venue and images of a user, in accordance with an embodiment of the present invention.

Turning now to FIG. 2, once the desired image 110 is selected and purchased form data storage device 112, the selected image 110 may be edited by user 102 through an editor 124, or other editing means known in the art. Editor 124 is accessible through the software application to edit and manipulate the selected image as desired by user 102. In essence, editor 124 allows user to transform or alter a photograph using various methods and techniques to achieve desired results. Editor 124 may include a graphics software known in the art. Editor may include at least one image editing tool 126a-c, including a sharpen function 126a, a saturate function 126b, and an add text function 126b.

In one embodiment, user 102 may integrate at least one supplemental image 122 into the selected image. Those skilled in the art will recognize that the advent of digital photography enables cropping, cutting, rotating, and expanding images, even on a mobile communication device 120.

Thus, the user 102 may: 1) download the selected image on the mobile communication device 120; 2) capture at least one supplementary image 122, such as a self-image (selfie), on the mobile communication device 120; and 3) integrate the supplemental image 122 into the selected image 110 to give the visual effect that the user 102 was proximal to the captured image. This visual effect may include the user in contact with performer 106, background musicians, coaches, and stage props during the event. The software application also allows user 102 to apply filters to the image and perform unique digital photography manipulations, known in the art.

In another embodiment, user 102 may manipulate the selected image by integrating text, video, color and pattern background changes, and any number of photography manipulations known in the art. For example, user 102 may print a caption at the top of the image. In any case, user 102 may perform many unique functions with edited image 118 that enhance and personalize the original selected image 110. The overall effect is that the user 102 appears more proximal to the venue 104 and the performer 106 than the user's 102 position at the venue 102 might normally allow.

In one embodiment, user 102 may display edited image 118 on a social media site or a website. In this manner, network members on the social media site may comment on edited image 118. The website may be used for entertainment or commercial purposes by the user 102. User 102 may also transmit edited image 118 through email, text, or video stream. It is significant to note that since user 102 has purchased the image, user 102 is generally free to display edited image 118 as desired.

In yet another possible embodiment of possibilities with edited image 118, user 102 may integrate edited image 118 on media. For example, edited image 118 may be printed on a t-shirt, a cap, a mug, wallpaper, or a commercial or marketing publication. These images may then be used for marketing or festivities.

Looking back again at FIG. 1, user 102 may trade edited image 118 on a network 128. Or other such similar trading platform. Other network members may purchase, exchange, and sell similar edited image 118 on the network 128. In one embodiment, user 102 may receive credit 116 for trading edited image 118. User 102 may also purchase another network member's edited image 118 with credit 116. User 102 may earn points each time edited image 118 is traded. Points may be redeemed for future purchases through the software application.

In some embodiments, system 100 may be used to generate revenue by the venue 104 or performer 106 at venue 104. In addition to the aforementioned payment by user 102 for accessing the captured image, a sponsor may advertise on mobile communication device 120 through the software application. The sponsor may pay a fee to access user 102 through the software application. For example, without limitation, pop-ups of products sold by the sponsor may appear periodically on user's 102 mobile communication device 120. In yet another alternative embodiment, the user 102 of the app pays the fee for access to the images. After receiving this fee, the performers are given a percentage of the revenue generated by the user of the app.

In yet another embodiment, venue 104 and performer 106 at venue 104 may communicate with user 102 through a software application on the mobile communication device 120. This communication may include information about products or services for sale, dates for future events, seat upgrades, promotional giveaways, and the like. The communication may be in the form of a message 130, such as text, a phone call, an email, or instant messaging that pops up on the user's mobile communication device 120.

Furthermore, upgrades to the image manipulation means may also be sold to user 102. For example, the digital software to manipulate the selected image may be enhanced to provide additional functions, such as removing red eye, for a small fee. In another alternative embodiment, an ancillary website may offer additional revenue generation by selling size enlargements of the captured images or custom photo frames with the images.

In one alternative embodiment, the system 100 can be further monetized by acquiring sponsors, including, without limitation, title sponsors, tour sponsors, event sponsors, and the like. The sponsors may also exhibit their logos on the image capturing devices, or on the app that is downloaded on the communication device.

In one exemplary operational use of the system 100, after the user 102 opens the app on the image capturing device 108a, 108b, 108c, locates the network and gains access to the image capturing device 108a, 108b, 108c, the screen on the mobile communication device 120 displays a plurality of thumbnail images that are configured to preview all existing camera angles. The user may view the thumbnail images freely. The user can purchase the image before or after viewing the thumbnail.

However, user 102 is restricted from expanding the size of the thumbnail image in a larger preview screens until a purchase is made. Once user 102 has purchased selected image 110 (any number of images), user 102 may swipe through the available preview screens of thumbnail images, and select a desired image therefrom. It is significant to note that user 102 is not purchasing a video stream of the selected images 110. User 102 is rather purchasing still images.

In one exemplary use of system 100, a production company or a venue is provided with a "network-in-a-box" which includes cameras, router, etc. which enables the producer of a live event to capture still images or video and send these images or video to users who have downloaded our associated app. The producer is then able to monetize this action by allowing users of the app to purchase pictures or videos.

Next, the user 102 is then able to manipulate the pictures by taking a selfie and placing and resizing the selfie over the purchased picture to commemorate the event. Any other type of editing as well, such as text, photo filters, etc. The producer may also include an image, band/production image/logo of the band or production. The user can edit this by repositioning a selfie or resizing over the purchased image.

Figure 3A:
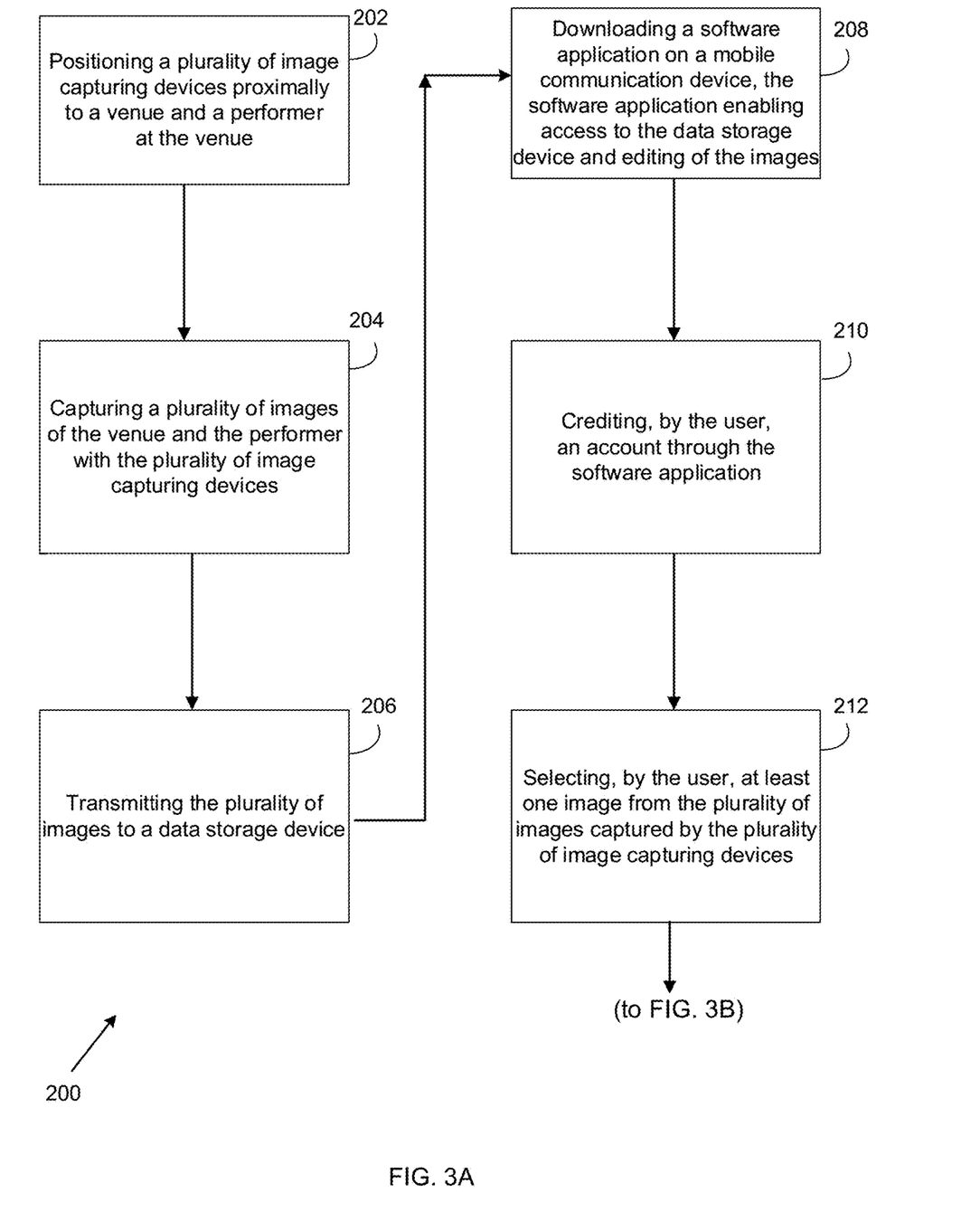
FIGS. 3A and 3B illustrate a flowchart of an exemplary method editing and monetizing personalized images at a venue, in accordance with an embodiment of the present invention.
Figure 3B:
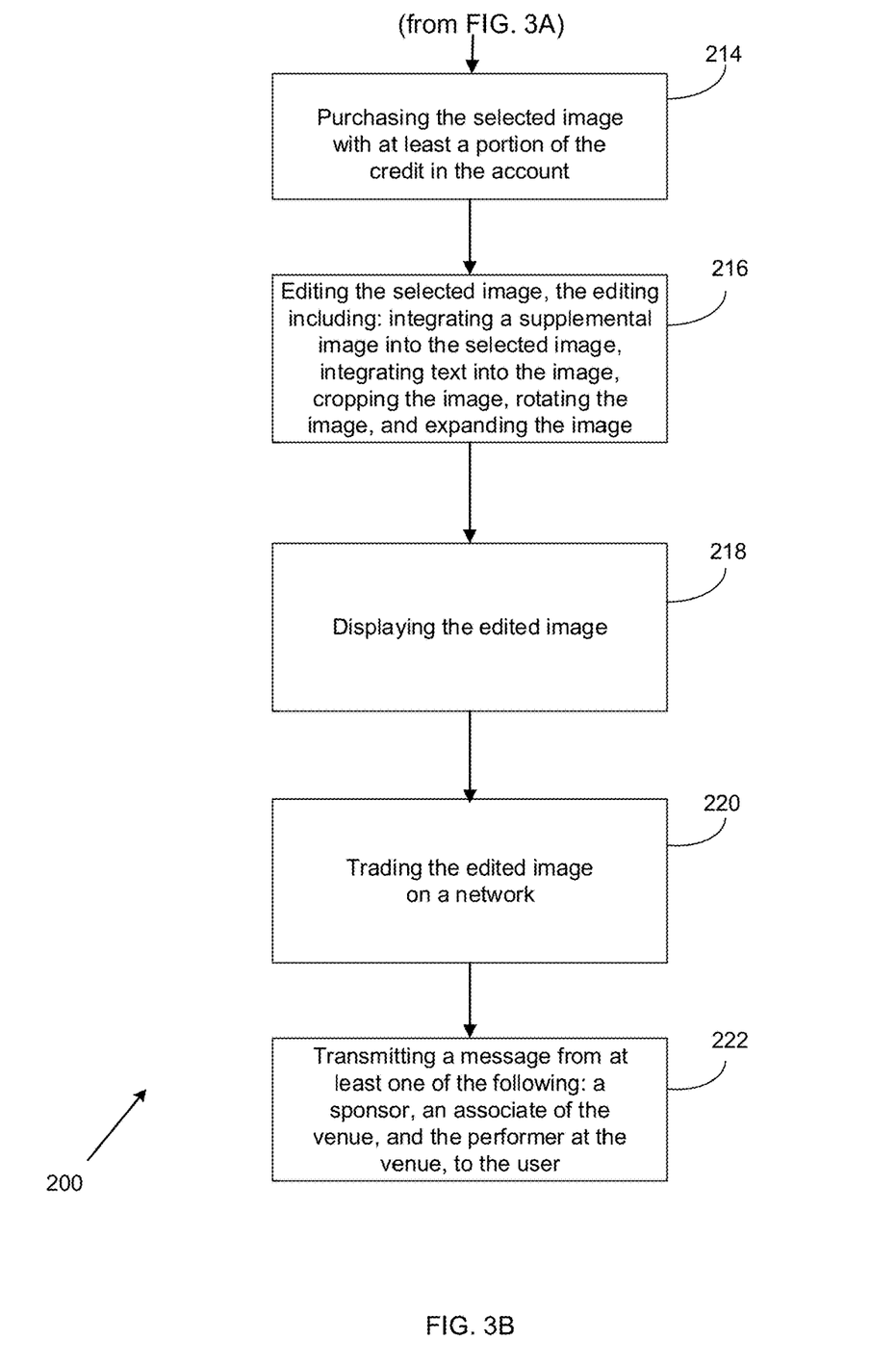

FIGS. 3A and 3B illustrate a flowchart of an exemplary method 200 for editing and monetizing personalized images at a venue. In one embodiment, method 200 enables a user 102 who is positioned remotely at a venue 104, a proximal image of performer 106. The user 102 may then access this image 110 and manipulate the image 118, so as to appear proximal to the performer 106. Method also provides various revenue generating means, such as charging user 102 for image 100, and charging sponsor to access user 102.

In one exemplary use of the method 200, a smart phone software application allows a user 102 who is attending a concert, sporting event, or live event the ability to purchase, capture, and save close-up photos of their favorite performer, rock/pop stars, celebrity, and athlete from anywhere in the event's venue regardless of where the user is seated. A plurality of high definition cameras are strategically positioned on stage, connected to a server, and user 102 can use the downloaded software application on a smart phone to access the high definition cameras and take pictures.

Though in other embodiments, a more global accessibility to user 102 is provided. It is also possible that user 102 can be anywhere, and not only in the venue 104 where the event is being held. In this embodiment, user 102 may access the images if the performer/band/production company allows access to users anywhere outside of the venue. The performer/band/production company have the ability to implement a geo-fence and allow users to access content anywhere inside that geo-fence. It may be only inside the venue, regionally or nationwide.

In one embodiment, method 200 may include an initial Step 202 of positioning a plurality of image capturing devices proximally to a venue and a performer at the venue, the positioning of the plurality of image capturing devices including at least one of the following views: a top pan view, a bottom pan view, a top angle perspective view, a bottom angle perspective view, a close up view, and a three-dimensional view. These views are generally not possible with a smart phone that is distally located from the performer 106. Also, the image capturing devices 108a-c may be high resolution quality, which is also generally superior to a smart phone camera.

In some embodiments, method 200 may further include a Step 204 of capturing a plurality of images of the venue and the performer at the venue with the plurality of image capturing devices. The images 110 are captured through high resolution cameras at close-up vantage points. These images 110 of performer 106, specifically, are not possible with a smart phone.

A Step 206 comprises transmitting the plurality of images to a data storage device. Data storage device 112 may include a server, a database, and a processor. Images 110 may be contained in a photo gallery or a video gallery that can be accessed both during and after the event. A Step 208 may include downloading a software application on a mobile communication device, the software application configured to enable access to the data storage device and editing of the plurality of images.

In some embodiments, a Step 210 may include crediting an account, by the user, through the software application. User 102 may register and open the account 114. User 102 may credit 116 the account 114 with money, so as to make purchases of the images 110 and other promotional items pertinent to the venue 104 and performer 106. A Step 212 includes selecting, by the user, at least one image from the plurality of images captured by the plurality of image capturing devices. A Step 214 comprises purchasing the selected image with at least a portion of the credit in the account. User 102 can utilize payment means known in the art to transact the purchase.

A Step 216 may include editing the selected image, the editing including at least one of the following: integrating a supplemental image into the selected image, integrating text into the selected image, cropping the selected image, rotating the selected image, and expanding the selected image. Thus, the manipulation involves downloading the selected image on the mobile communication device 120; capturing at least one supplementary image 122, such as a self-image (selfie), on the mobile communication device 120; and integrating supplemental image 122 into the selected image to give the visual effect that user 102 was proximal to the captured image, such as performer 106, background musicians, coaches, and stage props.

In one embodiment, method 200 utilizes a Step 218 of displaying the edited image. In one embodiment, user 102 may display edited image 118 on a social media site or a website. The website may be used for entertainment or commercial purposes by user 102. User 102 may also transmit the edited image 118 through email, text, or video stream. It is significant to note that since the user 102 has purchased the image, the user 102 is generally free to display edited image 118 as desired. In yet another possible embodiment of possibilities with the edited image 118, user 102 may integrate edited image 118 on media, including a print edited image on a cap, a t-shirt, a mug, and marketing publication.

A Step 220 comprises trading the edited image on a network. User 102 may pay credit 116 or receive credit 116, depending on whether edited image 118 is sold or bought from other members on the network 128. In some embodiments, user 102 may trade edited image 118 on a network or trading platform. Other network members may purchase, exchange, and sell similar edited image 118 on the network. In one embodiment, user 102 may receive credit 116 for trading edited image 118. User 102 may also purchase another network member's edited image 118 with credit 116.

A Step 222 comprises transmitting a message from at least one of the following: a sponsor, an associate of the venue, and the performer at the venue, to the user. The sponsor, associate, and performer may pay a fee to receive access to user 102. This helps generate revenue for method 200. Performer 106 and associate of venue 104 may also message user 102 for promotional or informational purposes. The message 130 may include a text, a phone call, or an email. For example, the performer could message user that another concert is coming up in a month. The sponsor could send event paraphernalia to the user 102 in a solicitation effort.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. One or more non-transitory computer storage media storing computer-usable instructions, that when used by one or more computing devices, cause the one or more computing devices to perform a method for editing and monetizing personalized images at a venue, the method comprising:
    positioning a plurality of image capturing devices proximally to a venue and a performer at the venue, such that the view or views of the plurality of image capturing devices include at least one of the following views: a top pan view, a bottom pan view, a top angle perspective view, a bottom angle perspective view, a close up view, and a three-dimensional view;
    capturing a plurality of images of the venue and the performer with the plurality of image capturing devices;
    transmitting the plurality of images to a data storage device;
    downloading a software application on a mobile communication device, the software application configured to enable access to the data storage device and editing of the plurality of images;
    crediting, by a user, an account through the software application;
    selecting, by the user, at least one image from the plurality of images captured by the plurality of image capturing devices;
    purchasing the selected image with at least a portion of the credit in the account;
    editing the selected image, the editing including at least one of the following: integrating a supplemental image into the selected image, integrating text into the selected image, cropping the selected image, rotating the selected image, and expanding the selected image;
    displaying the edited image;
    trading the edited image on a network;
    deleting the selected image from the data storage device, whereby the user has a unique image; and
    transmitting a message from at least one of the following: a sponsor, an associate of the venue, and the performer at the venue, to the user.

2. The one or more non-transitory computer readable storage media of claim 1, wherein the method further comprises a step of providing the sponsor, the associate of the venue, and the performer at the venue, access to the user, whereby the access enables transmission of the message.

3. The one or more non-transitory computer readable storage media of claim 2, wherein the method further comprises a step of charging a fee to the sponsor, the associate of the venue, and the performer at the venue, for providing access to the user.

4. The one or more non-transitory computer readable storage media of claim 3, wherein the method further comprises the step of transmitting a message from at least one of the following: a sponsor, an associate of the venue, and the performer at the venue, to the user, further includes transmitting a text, a phone call, or an email.

5. The one or more non-transitory computer readable storage media of claim 4, wherein the method further comprises a step of watermarking the plurality of images.

6. The one or more non-transitory computer readable storage media of claim 5, wherein the method further comprises a step of transmitting credit from the account to the performer.

7. The one or more non-transitory computer readable storage media of claim 6, wherein the method further comprises a step of printing the edited image on at least one of the following: a cap, a mug, a t-shirt, a towel, and a marketing publication.

8. The one or more non-transitory computer readable storage media of claim 7, wherein the method further comprises displaying the edited image on at least one of the following: a social media site, a website, a network, a photo gallery, and a video gallery.

9. The one or more non-transitory computer readable storage media of claim 8, wherein the method further comprises a step of selecting from a plurality of thumbnail images.

10. The one or more non-transitory computer readable storage media of claim 9, wherein the plurality of thumbnail images remain miniature sized until the user purchases the selected image.

11. The one or more non-transitory computer readable storage media of claim 10, wherein the software application is configured to communicate with the plurality of image capturing devices.

12. The one or more non-transitory computer readable storage media of claim 11, wherein the plurality of image capturing devices comprises a high definition camera.

13. The one or more non-transitory computer readable storage media of claim 12, wherein the venue includes at least one of the following: a stadium, an auditorium, a sports field, a concert hall, and a play stage.

14. The one or more non-transitory computer readable storage media of claim 13, wherein the plurality of images comprise at least a photograph or a video clip.

15. The one or more non-transitory computer readable storage media of claim 14, wherein the data storage device is a server comprising a photo gallery and a video gallery.

16. One or more non-transitory computer storage media storing computer-usable instructions, that when used by one or more computing devices, cause the one or more computing devices to perform a method for editing and monetizing personalized images at a venue, the method comprising:
    positioning a plurality of image capturing devices proximally to a venue and a performer at the venue, such that the view or views of the plurality of image capturing devices include at least one of the following views: a top pan view, a bottom pan view, a top angle perspective view, a bottom angle perspective view, a close up view, and a three-dimensional view;

capturing a plurality of images of the venue and the performer with the plurality of image capturing devices;

transmitting the plurality of images to a data storage device;

downloading a software application on a mobile communication device, the software application configured to enable access to the data storage device and editing of the plurality of images;

crediting, by a user, an account through the software application;

transmitting credit from the account to the performer;

selecting, by the user, at least one image from the plurality of images captured by the plurality of image capturing devices;

deleting the selected image from the data storage device, whereby the user is provided with a unique image;

purchasing the selected image with at least a portion of the credit in the account;

editing the selected image, the editing including at least one of the following: integrating a supplemental image into the selected image, integrating text into the selected image, cropping the selected image, rotating the selected image, and expanding the selected image;

displaying the edited image on at least one of the following: a social media site, a website, a network, and a photo gallery;

trading the edited image on at least one of the following: the social media site, the website, the network, and the photo gallery;

providing access to the user to at least one of the following: a sponsor, an associate of the venue, and the performer at the venue;

transmitting a message from at least one of the sponsor, the associate of the venue, and the performer at the venue; and charging a fee to at least one of the sponsor, the associate of the venue, and the performer at the venue, for providing access to send the message to the user.

17. The one or more non-transitory computer readable storage media of claim 16, wherein the method further comprises a step of printing the edited image on at least one of the following: a cap, a mug, a t-shirt, a towel, and a marketing publication.

18. The one or more non-transitory computer readable storage media of claim 17, wherein the plurality of images comprise at least a photograph or a video clip.

19. A system for editing and monetizing personalized images at a venue, the system comprising:

a venue configured to provide an environment for a performer to perform;

a plurality of image capturing devices configured to capture a plurality of images of a user, the plurality of image capturing devices disposed proximally to the venue and the performer, whereby the view or views of the plurality of image capturing devices include at least one of the following views: a top pan view, a bottom pan view, a top angle perspective view, a bottom angle perspective view, a close up view, and a three-dimensional view;

a software application configured to communicate with the plurality of image capturing devices;

a data storage device configured to store the plurality of images;

an account for purchasing at least one of the plurality of images comprising credit, the credit deposited into the account by the user;

an editor configured to edit at least one of the plurality of images;

a network configured to display the edited images;

a software application configured to delete a selected image from the data storage device, whereby the user is provided with a unique image;

and a message for advertising transmitted from the performer or a sponsor to the user, the message configured to influence the user.

* * * * *